(12) United States Patent
Conmy et al.

(10) Patent No.: US 7,836,140 B2
(45) Date of Patent: Nov. 16, 2010

(54) TEAM-BASED TASK INVITATIONS

(75) Inventors: Douglas W Conmy, Nashua, NH (US); Stephen D Eaton, Austin, TX (US); Oltea M Herescu, Austin, TX (US); Adeel Omer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 12/131,423

(22) Filed: Jun. 2, 2008

(65) Prior Publication Data

US 2009/0300113 A1 Dec. 3, 2009

(51) Int. Cl.
G06F 15/16 (2006.01)
(52) U.S. Cl. .................. 709/206; 705/8; 705/9
(58) Field of Classification Search .............. 709/206
See application file for complete search history.

(56) References Cited

U.S. PATENT DOCUMENTS

| | | | | |
|---|---|---|---|---|
| 5,111,391 A * | 5/1992 | Fields et al. | | 705/9 |
| 5,974,392 A * | 10/1999 | Endo | | 705/8 |
| 6,385,620 B1 * | 5/2002 | Kurzius et al. | | 1/1 |
| 6,735,570 B1 * | 5/2004 | Lacy et al. | | 705/7 |
| 7,155,399 B2 * | 12/2006 | Andre et al. | | 705/9 |
| 2002/0029161 A1 * | 3/2002 | Brodersen et al. | | 705/9 |
| 2003/0154212 A1 | 8/2003 | Schirmer | | |
| 2003/0177194 A1 * | 9/2003 | Crocker et al. | | 709/206 |
| 2005/0010463 A1 * | 1/2005 | Du et al. | | 705/8 |
| 2005/0021383 A1 * | 1/2005 | Fliess et al. | | 705/8 |
| 2005/0101335 A1 * | 5/2005 | Kelly et al. | | 455/456.3 |
| 2005/0177408 A1 * | 8/2005 | Miller | | 705/8 |
| 2006/0045029 A1 | 3/2006 | Ethier | | |
| 2006/0045253 A1 | 3/2006 | Bieselin | | |
| 2006/0047558 A1 * | 3/2006 | Uchiyama et al. | | 705/9 |
| 2006/0167938 A1 * | 7/2006 | Muller et al. | | 707/104.1 |
| 2006/0271419 A1 | 11/2006 | O'Sullivan | | |
| 2007/0106725 A1 * | 5/2007 | Starr et al. | | 709/204 |
| 2008/0040189 A1 * | 2/2008 | Tong et al. | | 705/9 |
| 2009/0157828 A1 * | 6/2009 | Agrawal | | 709/206 |

FOREIGN PATENT DOCUMENTS

JP 03296165 A2 12/1991

* cited by examiner

*Primary Examiner*—Philip C Lee
*Assistant Examiner*—Christopher Biagini
(74) *Attorney, Agent, or Firm*—D'Ambrosio & Menon, LLP; Jo Katherine D'Ambrosio; Usha Menon (57) ABSTRACT

A method for managing invitations to one or more events includes identifying an attribute required to perform an event. An invitation may be created so that invitees are selected according to the identified attribute required to perform the event. At least one person associated with a attribute may then be invited to attend the event. An invitation is sent to one or more persons associated with the attribute.

15 Claims, 5 Drawing Sheets

TEAM-BASED TASK INVITATIONS

BACKGROUND OF THE INVENTION

The present invention relates to the field of productivity tools to manage events and more specifically to inviting individuals to perform events.

Electronic calendars, emails and other workplace productivity tools have become widely used as a way of keeping track of appointments or meetings. Electronic calendars may be provided as a function of personal computers, laptop computers, desktop workstations, and server applications.

Meetings may be scheduled using an electronic calendar by a user selecting particular individuals to invite to the meeting. The user may send an invitation to each of the particular individuals. The receiving individuals may accept the invitation and attend the meeting, or deny the invitation and not attend the meeting. The acceptance or denial of the invitation is conveyed to the user. The meeting may be attended by the individuals who accepted the invitation.

SUMMARY

A computer implemented method of managing one or more invitations to one or more events is described herein. The method comprises identifying one or more attributes required to participate in at least one of the one or more events. The method further comprises associating the one or more attributes with one or more group identifiers and creating an invitation to participate in at least one of the one or more events. Further, the method comprises selecting, by the invitation, one or more persons associated with the one or more group identifiers and inviting one or more selected persons associated with the one or more group identifiers. The invitation is addressed to the one or more group identifiers.

A method of managing group based invitations to an event is described herein. The method comprises identifying a skill set required to perform the event, wherein the skill set includes one or more skills of one or more persons required to perform the event. The method further comprises creating an invitation to the event, wherein the invitation specifies the skill set required to perform the event and identifying one or more persons possessing the skill set. The method further comprises using the invitation to invite the one or more persons possessing the skill set wherein the invitation is addressed to the one or more group identifiers.

A computer program product for inviting one or more persons to perform an event is described herein. The computer program product comprises a computer usable medium having computer usable program code embodied therewith. The computer usable code comprises computer usable code configured to designate one or more group identifiers, wherein each of the group identifiers represents one or more attributes required to perform at the event. The computer usable code comprises computer usable code configured to create an invitation to the event based upon one or more group identifiers required to perform the event. The computer usable code comprises computer usable code configured to associate one or more persons possessing the one or more attributes required to perform the event with the one or more group identifiers. The computer usable code further comprises computer usable program code configured to send the invitation to one or more persons associated with the group identifier wherein the invitation is addressed to the one or more group identifiers.

An apparatus for inviting multiple persons to an event is described herein. The apparatus comprises one or more computer processors and one or more stored sequences of instructions which, when executed by the one or more processors, cause the one or more processors to carry out the instructions. The instructions comprise identifying a skill set required to perform the event, wherein the skill set includes one or more skills of one or more persons required to perform the event. The instructions further comprise creating an invitation strategy for selecting persons having the skill set and creating an invitation to the event, wherein the invitation specifies the skill set required to perform the event and wherein the invitation is addressed to the skill set. The instructions further comprise identifying one or more persons possessing the skill set and using the invitation to invite the one or more persons possessing the skill set.

DETAILED DESCRIPTION

Figure 1:
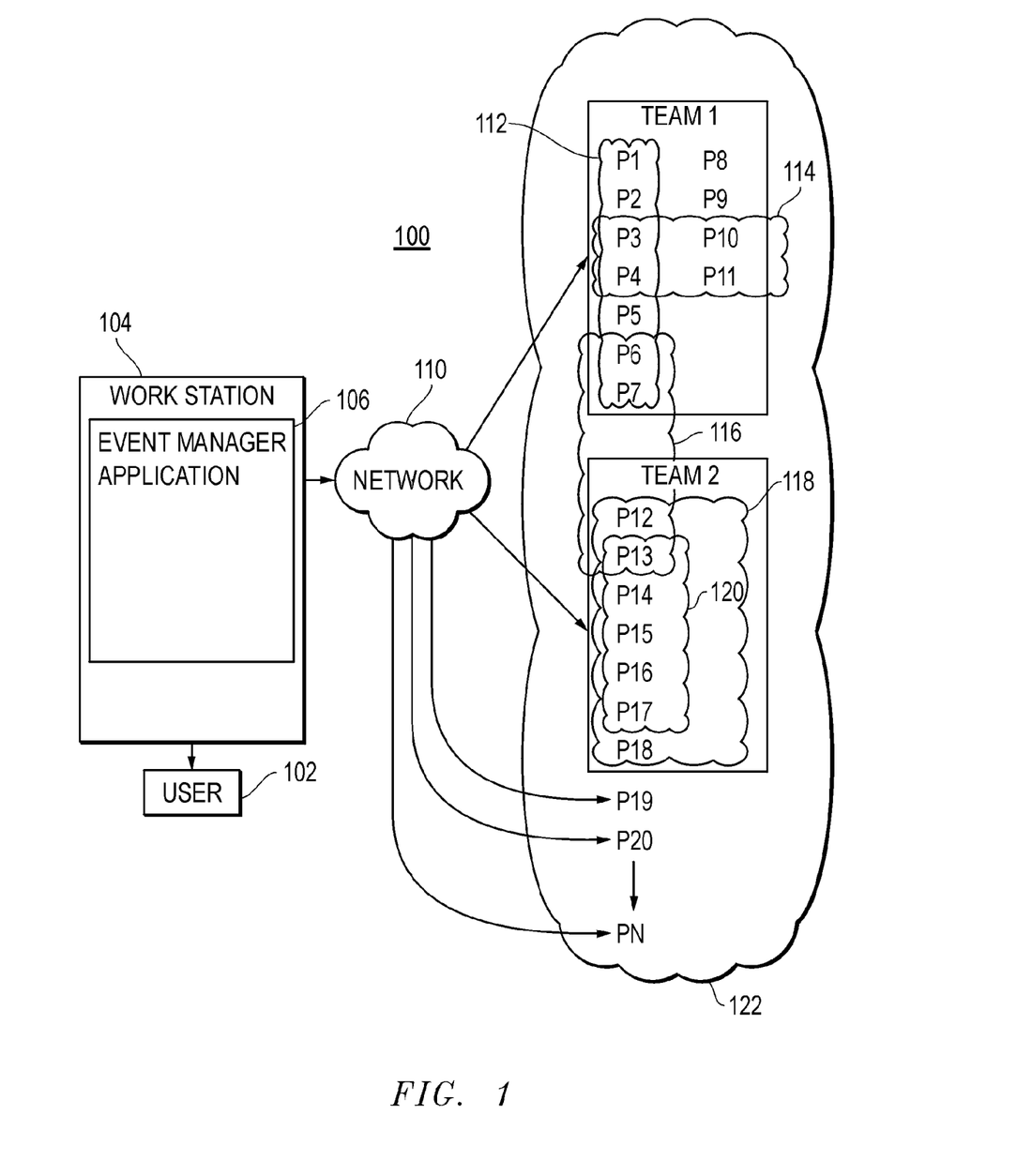
FIG. 1 is a block diagram of a networked system according to one embodiment.

FIG. 1 is a block diagram of a networked system 100 according to an embodiment described herein. A user 102 may use a workstation 104 which has an event manager application 106. The workstation 104 may be any suitable workstation including, but not limited to, a desktop computer, a laptop computer, a personal computer, and/or a personal digital assistant. The event manager application 106 may be capable of inviting one or more persons P1-PN to an event based on a group identifier associated with that person. The group identifier represents one or more attributes that a particular person may possess. Therefore, the event manager may invite persons P1-PN to an event based solely on a group identifier associated with the person. Any number of the persons P1-PN associated with a group identifier may receive and respond to the invitation on a client computer.

Embodiments described herein may be embodied as a system, method, or computer program product, as will be appreciated by one skilled in the art. Accordingly, the embodiments may take the form of an entirely hardware embodiment, an entirely software embodiment (including firmware, resident software, micro-code, and the like.) or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Embodiments described herein may use any combination of one or more computer usable or computer readable medium(s). The computer-usable or computer-readable medium is a non-transitory medium and may include, but is not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In one embodiment shown in FIG. 1, the networked system 100 may be used to create and send an invitation to an event to one or more persons P1-PN. The workstation 104 may execute the event manager application 106 upon instructions from a user 102. However, it should be appreciated that the applications may not literally reside on the workstation 104, or that the workstation 104 be solely responsible for executing the applications. For example, the event manager application 106 may comprise a workstation client and a server that is external to the workstation 104. Further, any suitable arrangement for the user 102 to access the event manager application 106 may be used.

The workstation 104 may be connected to a communication network 110. The network provides connectivity to other client computers, workstations, persons P1-PN, users or any other individual. As defined herein, an individual is anyone described herein. The network 110 may be any suitable communication network including, but not limited to, the Internet, a local area network (LAN), an extranet, an intranet, a global area network (GAN), a wide area network (WAN), a campus area network (CAN), an instant messaging (IM) server, a virtual private network (VPN), wire-based networking structures, and wireless networking structures.

FIG. 1 shows persons P1-PN in communication with the network 110 in addition to the user 102. The persons P1-PN may be placed on one or more teams, for example Team 1 and Team 2. Each team may represent an arbitrary assembly, or gathering of any number of persons. For example, a team may be a company, a department within a company, a school attended, a sports team, a club, a congregation, a group of persons skilled in a specific craft or technology, a group of persons that are responsible for completing a specific task, and the like. The persons may be grouped in any number of teams, or may not be a part of team and still be in communication with the network 110.

Figure 2A:
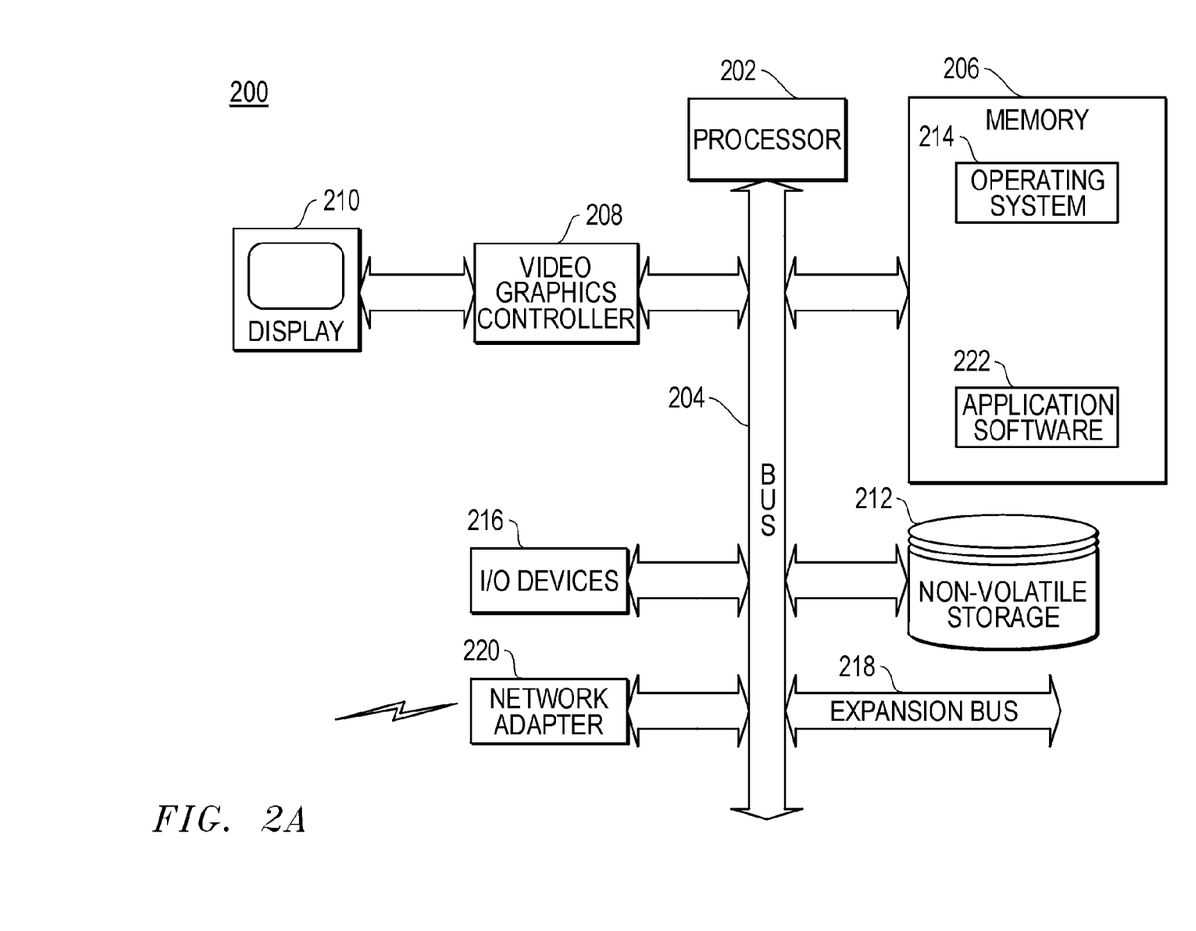
FIG. 2A is a block diagram of a general purpose information handling system according to one embodiment.

FIG. 2A shows a general purpose computing system 200 that the networked system 100 may employ. The computing system 200 may use any of the event manager application 106 and applications used by any of the persons P1-PN, and/or users according to one embodiment. The computing system 200 includes a processor 202. A bus 204 may couple the processor 202 to a system memory 206 and video graphics controller 208. A display 210 may couple to the video graphics controller 208. A nonvolatile storage 212, such as a hard disk drive, CD drive, DVD drive, or other nonvolatile storage may couple to the bus 204 to provide the computing system 200 with a permanent storage of information. An operating system 214 may load in the memory 206 to govern the operation of the computing system 200. One or more I/O devices 216 may couple to the bus 204. The input I/O devices 216 may be any suitable I/O devices including, but not limited to a keyboard, keypad, light pen, touch screen, button, mouse, track ball, speech recognition unit, display screen with an integrated touch screen, a display with an integrated keyboard, a speech recognition unit combined with a text speech converter, and any combination thereof. The display 210 and/or the I/O devices 216 may allow any individual described herein to interface with the computing system 200. One or more expansion busses 218, such as USB, IEEE 1394 bus, ATA, SATA, PCI, PCIE and other busses, may couple to the bus 204 to facilitate the connection of peripherals and devices to computing system 200. A network adapter 220 may couple to the bus 204 to enable the computing system 200 to connect by wire or wirelessly to network infrastructures such as the network 110 shown in FIG. 1.

The computing system 200 may load application software 222 from the nonvolatile storage 212 to the memory 206 for execution. The particular application software 222 loaded into memory 206 of the computing system 200 determines the operational characteristics of the computing system 200. The computing system 200 may be configurable as the event manager application 106 and as any applications used by the persons' P1-PN. The computing system 200 may similarly load any necessary applications into one or more of the user 102 and/or persons P1-PN client computers memory.

Figure 2B:
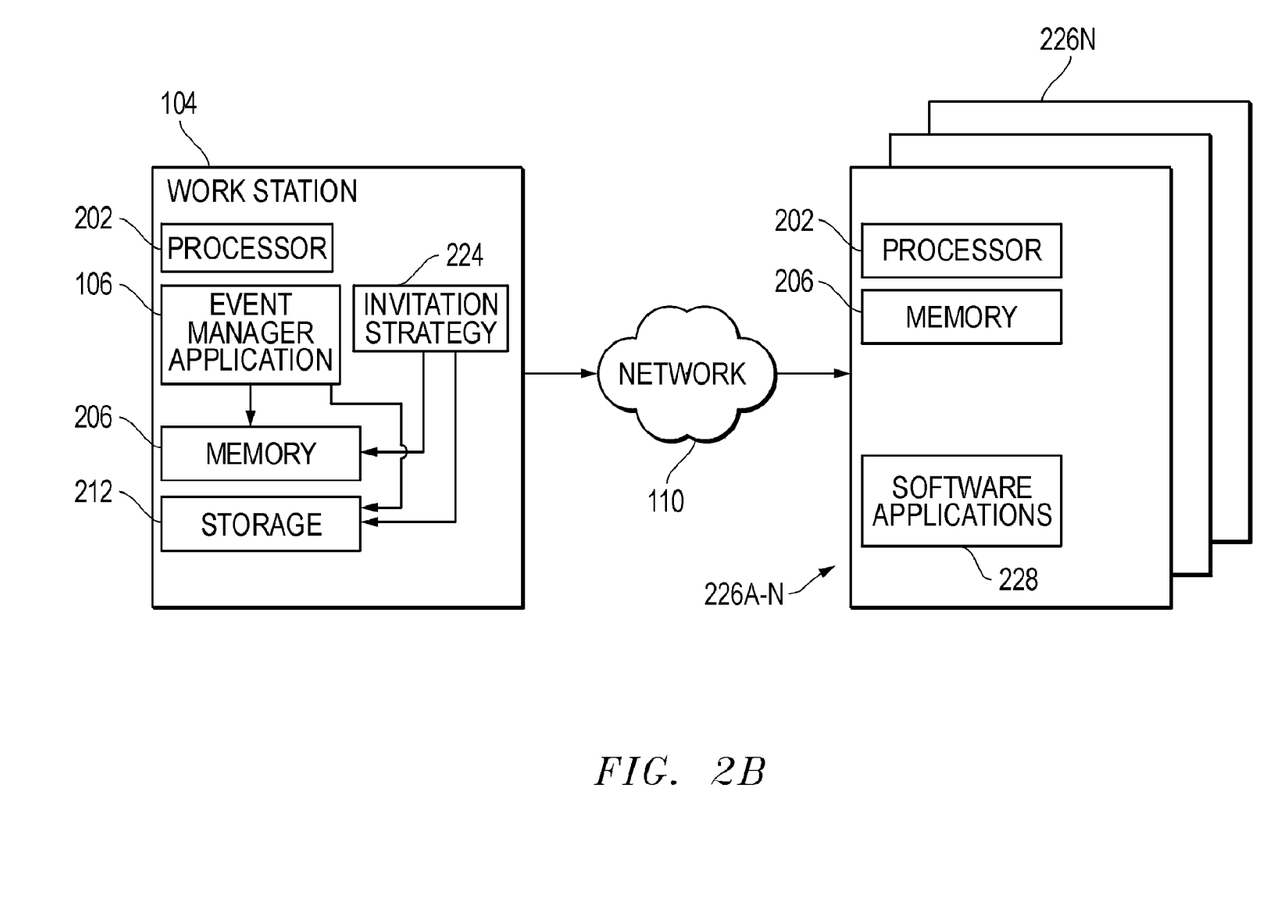
FIG. 2B is a block diagram of a networked system according to one embodiment.

FIG. 2B shows a block diagram of the workstation 104 connected to the network 110 and any number of client computers 226A-N. The workstation 104 may be used by the user and the client computers 226A-N may be used by any individual described herein. The workstation 104 may include the processor 202 the memory 206, the storage 212, and the event manager application 106. An invitation strategy application 224 may be included in the workstation 104 as a part of the event manager application 106, or may be a stand alone application, as shown. The event manager application 106 and the invitation strategy application 224 may be stored and retrieved from the storage 212, and/or the memory 206, or any combination thereof. The client computers 226A-N may include the processor 202, the memory 206, and any number of software applications 228. The software applications 228 may include any portion of the event manager application 106 and the invitation strategy application 224. The workstation 104 may send any number of instructions to the client computers 226A-N using the event manager application 106 and/or the invitation strategy application 224. Further, the workstation 104 and the client computers 226A-N may include any of the features of the computing system 200.

Figure 3:
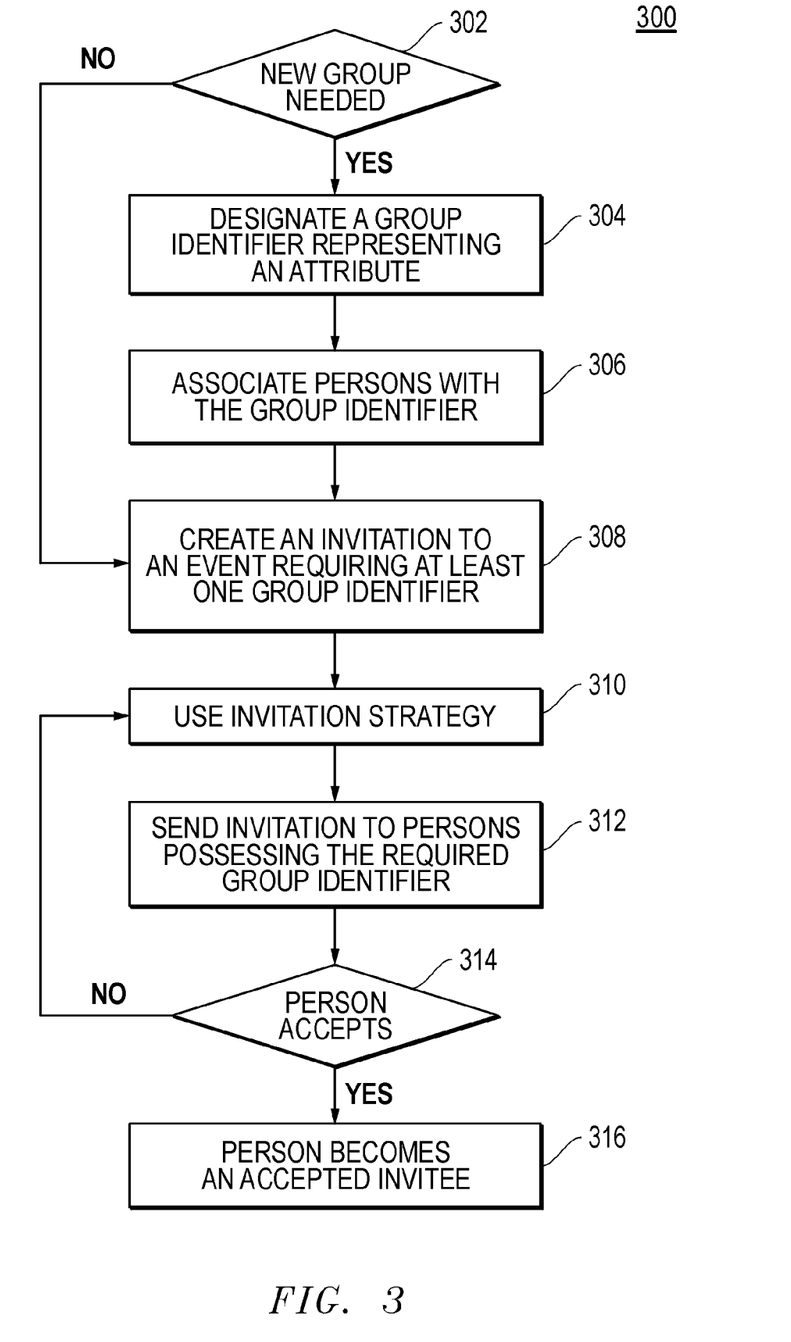
FIG. 3 is a flowchart that illustrates aspects of a method for inviting individuals to an event according to one embodiment.

FIG. 3 shows a flowchart that depicts a method 300 for the operation of the event manager application 106 according to one embodiment. In step 302, a decision is made about whether a new group is required to perform an event. A new group may be required to perform the event if a new attribute or set of attributes is required to perform at the event. For example, an event may require at least one person possessing the attribute of a computer programmer to perform at the event. If a group identifier has not been set up associating the attribute for a computer programmer, then a new group including all of the persons associated with the group identifier would be required. If the group is a group that has already been set up, a new group would not be required at step 302. If a new group is required, the method continues on to step 304, if a new group is not required, the method starts at step 308. In step 304, a group identifier is designated by the event manager application 106, the user 102, any other individuals and/or entities as will be described in more detail below. The group identifier represents at least one attribute that a person associated with, belonging to, member of the group identifier may possess. The attribute may be any attribute, for example, a skill set required to perform the event. In step 306, one or more of the persons P1-PN are associated with the group identifier. In step 308, the event manager application 106 may be used to create an invitation to the event, wherein the invitation requires at least one group identifier. In step 310, the invitation strategy is used, or employed. In step 312, an invitation is sent to the at least one of the persons possessing the required group identifier. In step 314, a person accepts or declines the invitation. In step 316, the person accepts the invitation, that particular person may be identified as part of an accepted invitee group. If the person declines the invitation, a new invitation may be sent out to another person based on the invitation strategy application 224.

The group identifier may be designated to represent any attribute or attributes. The group identifier may be a label, or tag, associated with the attribute(s) that one or more person may possess. With the group identifier designated to represent an attribute, the event manager application 106 may use the group identifier to organize events, as will be described in more detail below.

The group identifier may be designated by any individual and/or entity, depending on the parameters of the event manager application 106. For example, the user 102 may designate the one or more group identifiers to be used by the event manager application 106. Further, any of the persons P1-PN may designate the group identifier for his or herself. Further still, a team leader, a coach, a peer, or manager such as a human resources manager or a boss, or any other individual may designate the group identifier. The group identifier may be published, or disclosed, to anyone for whom communication with the group is useful. The event manager application 106 may also automatically designate the one or more group identifiers to any number of persons P1-PN based on the attribute(s) the person possesses or is in the process of obtaining.

Each attribute, represented by the group identifier, may be any arbitrary trait and/or skill that is associated or possessed by a person. The group identifiers therefore may be a label or tag for any number of attributes that a person may possess. Each attribute may be any combination of trait and/or skill or a combination of traits, skills, expertise, responsibility, authority, and education that a person possesses or is in the process of obtaining. The attribute may be a job position of the person in one embodiment. For example, Person 1 may be a CEO and may be designated with the group identifier representing the attribute for a CEO. Person 2 may be an accountant and therefore designated with a group identifier representing the attribute for an accountant. Further, the attribute may be a skill set possessed by the person. For example, the person 5 may be a computer programmer and therefore designated with a group identifier representing the attribute for a computer programmer. Person 6 may be a violinist and therefore designated with a group identifier representing a violinist. Further still, the attribute may be any suitable trait associated with the person including but not limited to, education, group associations, hair color, personality trait, home ownership, car ownership, school attended, and the like. Further, the attribute and therefore the group identifier may be disassociated from a person who no longer possess the attribute represented by the group identifier. It should be appreciated that the nature of the attributes represented by a group identifier is only limited by imagination; therefore, a complete list of possible attributes will not be included. The attributes may be stored in memory and/or storage for use by the event manager application 106 and/or any individual and/or entity described herein. Further, the attribute may be automatically stored in memory for use by the event manager application 106 upon the person gaining the attribute, for example by joining a team, or completing a course, and the like.

In one embodiment, the event manager application 106 may create one or more invitations to any number of events by requiring at least one of the group identifiers. For example, the user 102 may be organizing an event that requires the attendance of at least one person possessing the attribute of an accountant. The user 102 may then create the invitation having a required group identifier for accounting. The invitation may be automatically created by the computer based on the required group identifiers. Further, the user 102 may require the invitation to the particular event to be sent to any number of persons associated with the group identifiers. For example, the user 102 may require one person possessing a first group identifier, three persons possessing a second group identifier, and one person possessing a third group identifier to attend the event. In addition to at least one person associated with a group identifier, the user may require a particular person to attend the event as well, for example John Smith. Therefore, the user 102 may indicate which group identifiers and which particular persons are required to attend the event; the event manager application 106 may then automatically create an invitation directed to those persons associated with the group identifiers in addition to the particular person, John Smith, to attend the event. The group identifiers may be associated with the persons before sending an invitation. The user 102 may or may not know the names of the persons who were sent the invitations based on the group identifiers since the event manager 106 may direct the invitations blindly to those persons associated with the group identifier.

The event manager application 106 may associate any number of persons P1-PN with one or more group identifiers based on one or more attributes possessed by the person. The event manager application 106 may automatically associate the person with the group identifier based on attributes stored in memory. For example, upon a person joining a team, such as the accounting department, that person may automatically be given the attribute of an accountant and thus associated with the group identifier for an accountant. Further, the user, the person, a human resource employee, and/or any individual or any entity may associate any number of persons P1-PN with one or more group identifiers. In the case of the user, the team leader, the peer, or the manager associating the persons P1-PN with the group identifier, the group identifier may be revealed or withheld from the person and other people depending on the preference of the assignor of the group identifier. It is also contemplated that any combination of people or computer programs may associate the one or more group identifiers to any number of the persons P1-PN. For example, the user may assign person P2-P5 a first group identifier representing one or more attributes possessed by persons P2-P5, a manager may assign persons P3-P7, a second group identifier representing one or more attributes possessed by persons P3-P7, and the person P2 may assign themselves a third group identifier according to an embodiment.

There may be multiple group identifiers associated with any number of the persons P1-PN. Thus, any person may be associated with several group identifiers based on attributes possessed by that person. For example, FIG. 1 shows persons P1-PN. The persons P1-P11 are members of Team 1, persons P12-P18 are members of Team 2, and persons P19-PN are not members of a team. The teams, as described above may be any arbitrary team. Based on the attributes possessed by each of the persons P1-PN, the persons have been associated with a group identifier shown as a cloud. Thus, as shown in FIG. 1, persons P1-P7 have been associated with a first group identifier 112, persons P3, P4, P10 and P11 have been associated with a second group identifier 114, persons P6, P7, P12 and P13 have been associated with a third group identifier 116, persons P12-P18 have been associated with a fourth group identifier 118, persons P13-P17 have been associated with a fifth group identifier 120, and persons P1-PN have been associated with a sixth group identifier 122. All of the persons associated with a particular group identifier make up a group. Thus, the persons represented by the first group identifier 112 may represent a group 1 and the persons represented by sixth group identifier 122 may represent a group 6, and the like. It should be appreciated that the teams, the group identifiers, and the groups described in conjunction with FIG. 1 are for example purposes and therefore there may be any number of teams, group identifiers, groups, and persons associated with those group identifiers.

Any entity, such as the user 102, a manager, or computer, may create an invitation strategy application 224. The invitation strategy is a strategy for inviting particular persons associated with the particular group identifier, or a particular team, or a particular group to the event. The invitation strategy application 224 may specify which particular persons P1-PN are selected to be invited to a particular event. The invitation strategy application 224 may further choose a course of action for the event that the particular person selected for the event declines or has a time conflict.

The invitation strategy application 224 may be created by the user 102 of the event manager application 106. Further, it is contemplated that the invitation strategy application 224 may be created by a team leader, a group leader, any individual associated with the event, the event manager application 106, any of the persons P1-PN, any entity or a combination thereof. In the event the user 102 creates the initiation strategy, the user 102 designates which person(s) P1-PN possessing the group identifier would be the first to be included in the invitation. For example, the user 102 may create an invitation strategy application 224 in order to place all of the team members for Team 1 in a preferential order. The user 102 may then require the attendance of one person having the attributes associated with the first group identifier 112, and one person having the attributes associated with the second group identifier 114. Based on the preference selected by the user, the event manager application 106 may include a preferred person from each of the first and second group identifiers on the invitation. If the selected person rejects the invitation or is unavailable for some other reason, the event manager application may automatically select the next person having the group identifier based on the user's 102 preference.

A team leader may also create an invitation strategy application 224. For example, the head of the accounting department may be the team leader for the accountants. The team leader may then preferentially rank the accountants on the team leader's team. The preferential ranking may include certain members of the team that are not allowed to attend any events. Thus, when the event manager application 106 associates the persons P1-PN with the group identifiers and creates an invitation to the event, the invitation strategy of the team leader may be followed. The team leader invitation strategy may be used as an alternative or in addition to the user's invitation strategy. For example, the event manager application 106 may first use the team leader's strategy to select persons for the invitation associated with the group identifier. The event manager application 106 may then use the user's invitation strategy to select persons from the team for the invitation associated with the group identifier. The event manager application 106 may have one or more default invitation strategies that may be selected by any of the users, the persons, the team leaders, or any other individual and/or entity associated with the event. Further, any combination of invitation strategies may be used.

In one embodiment, the invitation strategy application 224 may select the persons to invite from the groups based on any number of criteria. For example, the invitation strategy application 224 may be based on the first person(s) associated with the required group identifier to accept an invitation. In this example, an invitation may be created inviting every person associated with a group identifier. The event manager application 106 may place the first person to accept the invitation in the accepted invitee category. The invitation to the group may be closed once the required number of persons associated with the group identifier have accepted the invitation. The invitation strategy application 224 may further select the persons to invite from the groups based any conceivable criteria including, but not limited to, the person(s) availability, the order of preference, random, sequential, a round robin, previous events attended, or any other suitable strategy.

The event manager application 106 may send an invitation to persons associated with the group identifier based on the invitation strategy application 224. The event manager application 106 may send the invitation to each of the persons attributed with each of the required group identifiers according to the one or more invitation strategies for each of the groups. Further, the event manager application 106 may send the invitation to multiple persons associated with the any number of group identifiers within any number of groups.

In operation, the user 102 may use the event manager application 106 to organize the event, for example, a marketing meeting. The user 102 may designate any number of group identifiers which represent attributes required for the marketing meeting. Further, any number of the group identifiers may be designated by any number of individuals, programs, or entities associated with the event, as described above. The user 102 may require six persons to attend the event, in one example. The user 102 may create an invitation to the event requiring persons from six groups represented by six group identifiers. Each of these group identifiers represent at least one attribute. For example, the six required group identifiers may represent an attribute of an accountant, a lawyer, a programmer, a secretary, a person with authority, and a person with sales experience. With the invitation created requiring the six group identifiers, the event manager application 106 associates persons P1-PN with the group identifiers. For example, the first group identifier 112, associated with the attributes for an accountant includes persons P1-P7. The second group identifier 114, associated with attributes for a lawyer includes persons P3, P4, P10 and P11. The third group identifier 116, associated with attributes for a programmer includes persons P6, P7, P12 and P13. The fourth group identifier 118 associated with attributes for a secretary includes persons P12-P18. The fifth group identifier 120 associated with attributes for a person with authority includes persons P13-P17. The sixth group identifier 122 associated with attributes for a person with sales experience includes persons P1-PN.

The user 102 may then employ an invitation strategy application 224 for each of the groups 1-6. The invitation strategy application 224 for each of the groups may be the same invitation strategy application 224 or may vary from group to group. Further, more than one invitation strategy application 224 may be applied by the user, a team leader, the event manager application 106, or any other entity for each of the groups. With the invitation strategy application 224 employed for each of the groups, the event manager application 106 may send an invitation to select persons within each of the groups. For example, the event manager may send an invitation only to person P2 within the first group identifier 112. If P2 accepts, P2 may become an accepted invitee. If P2 rejects the invitation, the event manager application 106 may automatically employ the invitation strategy application 224 to invite the next person, according to the invitation strategy application 224, within the first group identifier 112. This process may be repeated for each of the six groups associated with the group identifiers, until the accepted invitee list includes at least one person from each of the required group identifiers.

The event manager application 106 may automatically account for changes to the status of persons P1-PN and accepted invitees, between the time the invitations are presented and the event takes place. For example, if a person P1 is no longer on a team, or loses an attribute associated with a group identifier, the event manager application 106 may take appropriate action. Thus, the event manager application 106 may automatically disassociate that person from a group identifier, and/or revoke an invitation to the event to that person. Further, the event manager application 106 may send additional invitations to persons when one of the accepted invitees becomes disassociated with an attribute, or for any other reason is unable to attend the event. The event manager application 106 may then automatically employ the invitation strategy application 224 to send an invitation to the next person within the required group. If this person accepts, they will be become an accepted invitee. If this person declines, the event manager application 106 may automatically repeat this process until a person associated with the group identifier is found for the event. The event manager application 106 may inform the user 102 of the identity of the accepted and/or invited persons, or withhold the identity of the accepted and/or invited persons. The event manager application 106 may notify the user 102 of the accepted invitees once they have all accepted, or all rejected the invitation. Further, the event manager application 106 may notify the user 102 of the acceptance status of any of the persons at any time. Also the event manager application 106 may keep a status report for each of the invitees during the invitation process. The status report may include, but is not limited to, who has accepted the invitation, who has declined the invitation, who has not read the invitation, who has read the invitation, who has been withdrawn from the accepted invitees, or who is the next person to invite according to the selection strategy.

Figure 4:
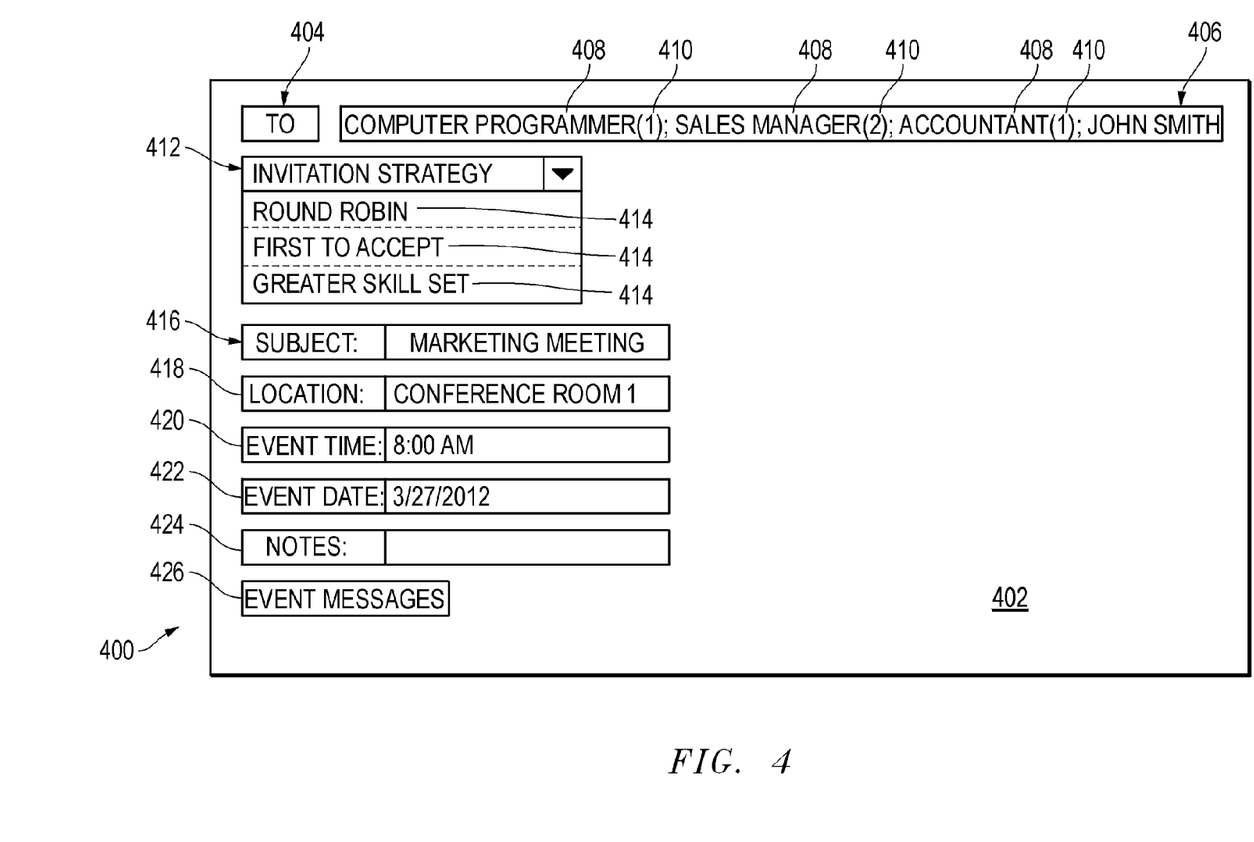
FIG. 4 is a display according to one embodiment.

In one embodiment, the event manager application 106 is a calendar application enabled to process invitations that require at least one group identifier for persons possessing at least one attribute to perform an event. FIG. 4 shows a display panel 400 showing a graphic 402 of a calendar application using the event manager application 106. The calendar application allows the user 102 to invite specific persons or persons having a specific attribute or skill set, represented by the group identifier to the event. The graphic 402 may include an invite button 404, shown as a "to" button. The invite button 404 may allow the user 102 to select persons and group identifiers required to perform the event. For example, the user 102 may select one or more specific person 406 who is required to perform the event. As shown, the user 102 has selected John Smith as the one or more specific person 406 required to perform the event. The invite button 404 may allow the user 102 to select the one or more group identifiers required to perform the event. The group identifiers are shown as one or more sample group identifiers 408. The sample group identifiers may represent attributes, such as skill sets, required to perform the event. The sample group identifiers 408, as shown, include a group identifier representing a computer programmer, a group identifier representing a sales manager, and a group identifier representing an accountant. Each of the sample group identifiers 408 may include a number of invitees 410 button and/or option. The number of invitees 410 may allow the user 102 to select a specific number of persons that are required to perform the event for each of the sample group identifiers selected. Thus, for the event shown in FIG. 4, John Smith, one computer programmer, two sales managers, and an accountant are required to perform the event.

Further, the graphic 402 may include an invitation strategy application button 412 and/or option. The invitation strategy application 412 may allow the user to pick a particular invitation strategy for each of the group identifiers selected. As shown, there are three sample invitation strategies 414 to choose from. There may be any suitable number of invitation strategies, and they may be associated with all or a select number of the required group identifiers to perform the event. The graphic 402 may include other suitable options including, but not limited to, a subject of the event 416, a location of the event 418, the event time 420, the event date 422, event notes 424, and event messages 426.

In an additional embodiment, messages may be automatically sent to all accepted invitees. Messages may include any suitable form of communication to individuals described herein including, but not limited to, email, text messages, recorded messages, correspondence, and the like. For example, the user 102 may wish to send all accepted invitees directions to the event. The user 102 may instruct the event manager application 106 to send the directions to all of the accepted invitees. The event manager application 106 may automatically resend the previous message regarding the event, and/or the directions, to any newly accepted invitees. Further, the event manager may send any number of messages to persons associated with any of the groups.

In yet another additional embodiment, the event manager application 106 may also invite an entire group or groups to the event. Further, the event manager application 106 may invite an entire team, or select persons from a team.

In another additional embodiment, the event manager application 106 may proactively search for individuals who are associated with the highest number of group identifiers. For example, if an accountant and a computer programmer are required at the event, the event manager application 106 may give preference to any individual who is both an accountant and a computer programmer. This allows the event to include the minimum number of attendees while maximizing the skill sets which attend, thereby conserving total working hours and reducing communication overhead.

Further, the event manager application 106 may automatically adjust the accepted invitees calendar based on the acceptance of the invitation.

In another embodiment, the event manager application 106 may automatically search for persons having a greater skill set. The event manager application 106 may automatically invite persons having the greatest skill set. The greatest skill set may be determined by any number of suitable criteria including, but not limited to, years of experience, grades, programming languages known, number of languages spoken, number of attributes possessed and the like. Further, the event manager application 106 may withdraw an invitation to a person if another person possessing a greater skill set is found or becomes available.

In an additional or alternative embodiment, the event manager application 106 may retrieve the availability of each of the persons. The event manager application 106 may assist the user 102 by indicating busy and free time of the persons P1-PN, based on the persons P1-PN own calendars. The event manager application 106 may allow the user 102 to find the best time based on the persons P1-PN, and/or accepted invitees' free time. The event manager application 106 may use the availability of the persons associated with the group identifier when creating an invitation and/or scheduling a time for the event. For example, the event manager application 106 may display all available, or unavailable, times of the persons within the group to the user 102. Further still, the event manager application 106 may display only the time and/or dates the event may occur based on the availability of the persons within the group. For example, if Person 1 is only available from 9:00 AM to 10:30 AM, and Person 2 is only available from 10:30 AM to 11:00 AM, then the event manager application 106 may display an available time of 9:00 AM to 11:00 AM for the for the event to occur and still include at least one group member. Further, the event manager application 106 may only invite persons from the group who are available during the scheduled time for the event.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially, concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for the purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of managing group-based invitations to an event, the method comprising:
   identifying a skill set required to perform the event, wherein the skill set includes a plurality of skills required to perform the event;
   associating the skill set with a plurality of group identifiers;
   creating an invitation to the event, wherein the invitation is addressed to the plurality of group identifiers and specifies the skill set required to perform the event;
   identifying at least one person possessing the skill set from among one or more persons based on an association of the one or more persons with the plurality of group identifiers, wherein each of the at least one person possesses at least one skill of the skill set;
   sending the invitation to the at least one person identified as possessing the skill set in accordance with one or more invitation strategies, wherein at least one of the one or more invitation strategies comprises ranking the one or more persons in accordance with one or more criteria, the one or more criteria including a number of the plurality of group identifiers with which each of the one or more persons is associated; and
   withdrawing the invitation from the at least one person possessing the skill set and sending the invitation to a second at least one person on the condition that the second at least one person is identified as possessing a second skill set comprising a greater number of skills than the skill set,
   wherein the method is implemented by one or more computing devices, each of the one or more computing devices including at least one processor and a memory, at least one processor of at least one of the one or more computing devices executing computer-readable program code stored in the memory of the at least one of the one or more computing devices to perform steps of the method.

2. The method of claim 1, wherein the one or more criteria further comprises a preference of a manager of the event.

3. The method of claim 1, further comprising withdrawing the invitation from a person to whom the invitation is sent on the condition that the person no longer possesses at least one skill of the skill set.

4. The method of claim 1, further comprising addressing the invitation to a specific number of persons, each of the specific number of persons having one or more skills of the skill set.

5. The method of claim 1, further comprising sending the invitation to one or more additional persons in addition to the at least one person on the condition that each of the one or more additional persons possesses one or more skills of the skill set.

6. The method of claim 1, further comprising sending a new invitation when the skill set changes.

7. The method of claim 1, further comprising sending a message regarding a detail of the event to a plurality of accepted invitees.

8. The method of claim 7, further comprising automatically sending the message to a newly accepted invitee.

9. The method of claim 1, wherein the ranking the one or more persons in accordance with the number of the plurality of group identifiers with which each of the one or more persons is associated comprises:
   determining the number of the plurality of group identifiers with which each of the one or more persons is associated; and
   ranking the one of more persons associated with the plurality of group identifiers based on the determination of the number of the plurality of group identifiers with which each of the one or more persons is associated,
   wherein on the condition that a first person of the one or more persons is associated with a greater number of the plurality of group identifiers than a second person, the first person is preferentially invited to the event over second person.

10. The method of claim 1, wherein the one or more invitation strategies further comprises:
   an invitation strategy generated by at least one of the one or more persons associated with the plurality of group identifiers;
   an invitation strategy generated by a creator of the invitation; and
   one or more default invitation strategies associated with the plurality of group identifiers.

11. A computer program product for managing group-based invitations to an event, the computer program product comprising:
   a computer readable medium having computer readable program code embodied thereon, the computer readable code comprising:
      computer-readable code configured to associate a skill set required to perform the event with a plurality of group identifiers, the skill set comprising a plurality of skills required to perform the event;
      computer readable code configured to create an invitation to the event, wherein the invitation is addressed to the plurality of group identifiers and specifies the skill set required to perform the event;
      computer readable code configured to associate one or more persons with the plurality of group identifiers;
      computer readable code configured to identify at least one person possessing the skill set from among the one or more persons based on the association of the one or more persons with the plurality of group identifiers, wherein each of the at least one person possesses at least one skill of the skill set;
      computer readable program code configured to send the invitation to the at least one person, identified as possessing the skill set in accordance with one or more invitation strategies, wherein at least one of the one or more invitation strategies comprises ranking the one or more persons in accordance with one or more criteria, the one or more criteria including a number of the plurality of group identifiers with which each of the one or more persons is associated;
      computer readable code configured to withdraw the invitation from the at least one person possessing the skill set and send the invitation to a second at least one person on the condition that the second at least one person is identified as possessing a second skill set comprising a greater number of skills than the skill set.

12. The computer program product of claim 11, further comprising computer readable code configured to automatically withdraw the invitation from a person to whom the invitation is sent on the condition that the person no longer possesses at least one skill of the skill set.

13. The computer program product of claim 12, further comprising computer readable code configured to automatically send the invitation, in accordance with the one or more invitation strategies, to a replacement person to replace the person from whom the invitation was withdrawn.

14. An apparatus for managing group-based invitations to an event, comprising:
   one or more computer processors; and
   one or more stored sequences of instructions which, when executed by the one or more processors, cause the one or more processors to carry out the instructions for:
      identifying a skill set required to perform the event, wherein the skill set includes a plurality of skills required to perform the event;
      associating the skill set with a plurality of group identifiers;
      identifying at least one person possessing the skill set from among one or more persons based on an association of the one or more persons with the plurality of group identifiers, wherein each of the at least one person possesses at least one skill of the skill set;
      creating one or more invitation strategies, wherein at least one of the one or more invitation strategies comprises ranking the one or more persons in accordance with one or more criteria, the one or more criteria including a number of the plurality of group identifiers with which each of the one or more persons is associated;
      creating an invitation to the event, wherein the invitation is addressed to the plurality of group identifiers and specifies the skill set required to perform the event;
      sending the invitation to the at least one person possessing the skill set in accordance with the one or more invitation strategies; and
      withdrawing the invitation from the at least one person possessing the skill set and sending the invitation to a second at least one person on the condition that the second at least one person is identified as possessing a second skill set comprising a greater number of skills than the skill set.

15. The apparatus of claim 14, wherein at least one of the one or more invitation strategies comprises adjusting the invitation based on an availability of the at least one person.

* * * * *